US009811854B2

(12) United States Patent
Lucido

(10) Patent No.: US 9,811,854 B2
(45) Date of Patent: Nov. 7, 2017

(54) 3-D IMMERSION TECHNOLOGY IN A VIRTUAL STORE

(71) Applicant: John A. Lucido, Rocky Point, NY (US)

(72) Inventor: John A. Lucido, Rocky Point, NY (US)

( * ) Notice: Subject to any disclaimer, the term of this patent is extended or adjusted under 35 U.S.C. 154(b) by 732 days.

(21) Appl. No.: 14/321,984

(22) Filed: Jul. 2, 2014

(65) Prior Publication Data

US 2015/0106241 A1 Apr. 16, 2015

Related U.S. Application Data

(60) Provisional application No. 61/842,020, filed on Jul. 2, 2013.

(51) Int. Cl.
*G06Q 30/06* (2012.01)
*G06F 3/01* (2006.01)
*G06F 17/00* (2006.01)

(52) U.S. Cl.
CPC ......... *G06Q 30/0643* (2013.01); *G06F 3/014* (2013.01); *G06F 3/016* (2013.01); *G06F 17/00* (2013.01)

(58) Field of Classification Search
CPC ..... G06C 30/0643; G06F 3/014; G06F 3/016; G06F 17/00
USPC .......................................................... 705/27.2
See application file for complete search history.

(56) References Cited

U.S. PATENT DOCUMENTS

2011/0254671 A1* 10/2011 Okimoto ................. G06F 3/016 340/407.1
2012/0188192 A1* 7/2012 Sano ....................... G06F 3/011 345/173

* cited by examiner

*Primary Examiner* — Mila Airapetian
(74) *Attorney, Agent, or Firm* — Thomas A. O'Rourke; Bodner & O'Rourke, LLP

(57) ABSTRACT

A system creates an enhanced virtual shopping experience, and includes means for generating a 3-D mesh model of a person's body contours; means for digitizing the three-dimensional shape of a piece of clothing when worn by the correspondingly sized body; means for measuring surface friction and intensity/frequency of vibrations produced during sliding tactile contact with the material of the clothing, for digitally approximating a material's texture; and a means for obtaining three dimensional visual images of the interior of a store. A 3-D headset is configured to receive the three-dimensional visualization of the store interior, and provide it to a person that may also wear a wired glove and body suit configured to provide tactile feedback or feedback through the use of electrodes. A software algorithm digitally inserts the person's mesh model into the three-dimensional store visualization, and allows manipulation of it therein, including realistic simulated contact of objects therein using reverse-electro-vibrations sent to the body suit.

12 Claims, 1 Drawing Sheet

200
202
244 Touch Screen Display
243 Keyboard
242 Mouse/ Position Pointing Device
241 External Storage
201
225 Volatile Storage
226 Persistent Storage
227 EPROM Firmware Storage
Data Bus 224
221 Touch Screen
222 CPU
223 Network Interface Card
203
262
263
264
261 Internet

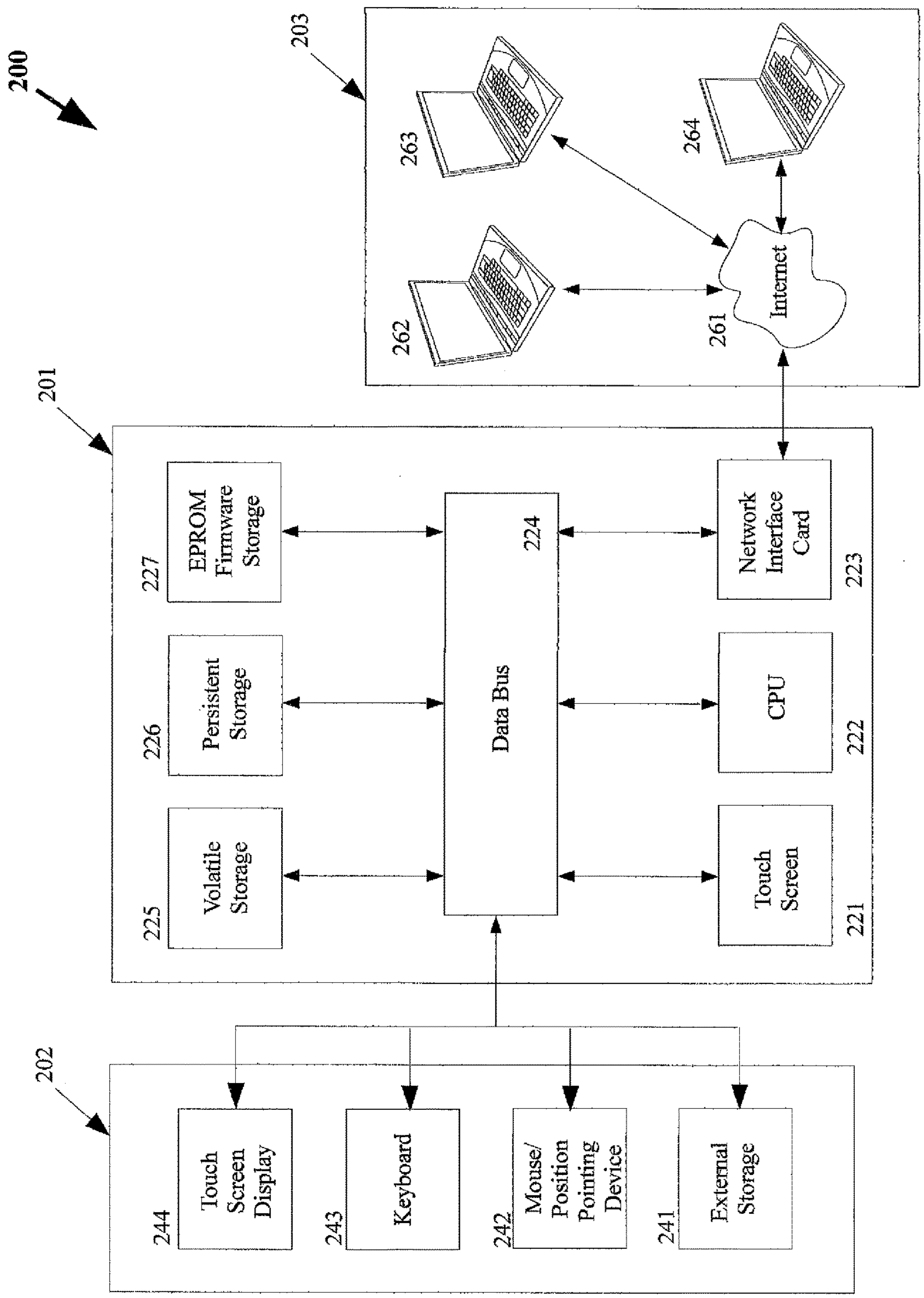
200
203
263
264
262
Internet
261
201
EPROM Firmware Storage
227
Persistent Storage
226
Volatile Storage
225
Data Bus
224
Network Interface Card
223
CPU
222
Touch Screen
221
202
Touch Screen Display
244
Keyboard
243
Mouse/ Position Pointing Device
242
External Storage
241

3-D IMMERSION TECHNOLOGY IN A VIRTUAL STORE

CROSS REFERENCE TO RELATED APPLICATIONS

This application claims priority on U.S. Provisional Application Ser. No. 61/842,020 filed on Jun. 2, 2013, the disclosures of which are incorporated herein by reference.

FIELD OF THE INVENTION

The present invention relates to improvements in online shopping within a virtual mall, and more particularly to a method and system which are capable of providing a shopper with a more realistic shopping experience. The virtual environment of the present invention also has advantageous use with respect to touring or viewing in general, such as for virtual visiting of museums, or for virtually experiencing concerts/plays, or even for virtually experiencing space travel, etc.

BACKGROUND OF THE INVENTION

The origins of E-commerce can be traced back to early direct marketing to customers by phone ("telemarketing"), and to T.V. commercials that advertised products that could be purchased from home by calling a phone number on the television screen, which eventually developed into half-hour or hour-long infomercials. However, the birth of the world-wide-web in the early 1990s provided even greater opportunities for e-commerce, and fostered the creation of the online retail giant Amazon.com®, and also the multinational online consumer-to-consumer auction provider eBay®. As technology breakthroughs occur, the opportunities for its application to further improve the electronic shopping experience continually evolve.

Many bricks and mortar clothing retailers now have websites that permit viewing of their products in each of the available colors, and additionally list the available sizes. There are also many inventions that have sought to further improve the online marketing of retail products by seeking to add particular enhancements to the virtual experience. For example, U.S. Pat. No. 6,307,568 to Rom for "Virtual Dressing over the Internet" teaches "a system for displaying garments . . . as though the garments were being draped over the body of a user," by fitting "articles of clothing to an image of a user," using "a picture of the user" and "critical points" that are "taken from the image of the user, and are used to adjust the spatial configuration of the clothing." In addition, U.S. Pat. No. 7,149,665 to Feld teaches that "Virtual two-dimensional patterns representing different portions of the wear article are assembled into a virtual three-dimensional wear article," and furthermore teaches that a "material type is associated with one or more of the virtual patterns and the virtual three-dimensional wear article," permitting "the virtual wear article to stretch, flex, sag, etc., on the virtual model to better approximate the real-life fit and look of the wear article on an object during design of the wear article."

The present invention seeks to dramatically improve the realism of the virtual shopping experience beyond these and other inventions.

BRIEF DESCRIPTION OF THE DRAWINGS

FIG. 1 is a schematic diagram of an exemplary computing unit capable of running the software of the current invention, and may include cellular phones, personal computers and other wired/wireless smart devices, and which may be capable of interacting with external peripherals and other devices over the internet.

DETAILED DESCRIPTION OF THE INVENTION

There are many consumers who enjoy traveling to a retail store, particularly at a large shopping mall, so that they may try on clothing to see if the size is correct and if the particular cut by designer fits their frame well, and also to see if they find the visual appearance of the garment aesthetically pleasing when viewed on their person. Moreover, many consumers also assess the quality and/or desirability of the clothing based upon the feel of the material on their body, and the material's texture when rubbed between the person's thumb and forefinger. In addition, some consumers like to hold the garment in front of them using their hands to assess its weight and to see how sheer it may or may not be, and also to see how it tends to generally drape. They may also wish to examine the interior lining of the item, and to assess the overall quality of manufacture of the garment.

However, despite these advantages of shopping at a bricks and mortar retailer, for many consumers proximity and scheduling constraints often limit when they may have a sufficient amount of time to make the commute thereto, and to enjoy the shopping experience without unnecessary haste. The problem is exacerbated for consumers who live in rural areas that are at considerable distances away from particular retailers.

The present invention provides the ability for the consumer to enjoy the above described advantages attained when actually shopping at a bricks and mortar clothing retailer, but while instead conveniently shopping from home, using the enhanced virtual shopping experience disclosed herein.

There are several aspects to the present invention, which are joined through the application of particular technology to provide for an enhanced shopping experience. A first aspect of the present invention pertains to the particular user who will be doing the shopping. In order for the person to accurately assess the fit of a particular manufacturer's clothing upon their body, their own physical form must first be digitized. Three-dimensional (3-D) shape information may be gathered to generate a simulated 3-D mesh model of their body contours using one of several methods. In a first embodiment for producing such digital definition, a 3-D model may be created using a contact 3-D scanner probe that physically touches the object—the person, while resting upon a precision flat surface plate. Another method, which would be much less invasive for the average consumer, entails creating three-dimensional models using 2-D photographs and specialized software, such as, for example, the object modeler available from 3dsom.com. Alternatively, 3-D modeling may be obtained through the use of a non-contact remote scanning system, such as LiDAR (e.g., light-radar), where a narrow pulsed laser beam is used to illuminate the target (the person's body), and the reflected light is analyzed, often with a gated camera, to produce the three-dimensional definition. The 3-D data may be preferably utilize X3D, which is an ISO standard XML-based file format for 3D computer graphics that permits humanoid animation, and is the successor to the Virtual Reality Modeling Language (VRML).

Although photographs may also suffice, the latter method would be well suited for quick 3-D imaging of the person who may desirably be posed at multiple standard positions (e.g., standing with arms at side and legs together, standing with arms bent, standing with arms outstretched, standing with arms crossed; standing with legs apart as if walking; sitting with arms on lap, sitting with arms resting on bent . . . ). The imagery may be updated to adjust the 3-D mesh model if the consumer gains or loses weight, or otherwise grows, particularly if the consumer is a young child.

Another aspect of the present invention involves the modeling of the garments of a particular clothing manufacturer. This may be obtained using a clothes measurement system by three-dimensional digitizing of the shape of each piece of clothing, as worn by the ideal sized body or mannequin, and with the input of design tolerances for the manufacturing of each garment type/size. Additional imaging may be produced to characterize the garment from all angles, including when looking at its interior, or when holding it up in front of a prospective purchaser. The texture of the material of each garment may be characterized using, for example, an artificial finger. The artificial finger may be equipped with strain gauges adapted to measure surface friction and to measure the different intensities and frequencies of the vibrations produced during certain tactile tasks performed by the finger upon the material, as disclosed, for example, in "Material Classification by Tactile Sensing Using Surface Texture," by Jamali, N, and Sammut, C., IEEE Transactions on Robotics, 508-521 (2011), the disclosures of which are incorporated herein by reference.

A further aspect of the present invention is that 3-D imagery may also be produced, using any of the above methods, for the interior of the bricks and mortar store for each retailer, which need not necessarily be a clothing retailer.

Finally, the software of the present invention may be configured to provide this imagery to the user, who may wear 3-D goggles or a headset, in order to produce a three-dimensional visualization of the interior of the store, including all of the garments and other items for purchase that are located therein. A series of cameras within participating stores may be used to obtain visual images of the actual bricks and mortar retail environment, images which may be received and utilized by the head set, so the user may engage virtually in a store shopping experience. The virtual shopping experience may either be a real-time virtual experience (i.e., live store images are streamed to the head set), or a virtual experience that lags behind the real-time store activity (i.e., images recorded from an earlier time in the day are used). The user may thereby immerse themselves within the virtual store and interact therein, in one of several ways. In the first method, the person may interact using an Avatar, which is their three-dimensional computer representation created by the mesh model, so the user would be a $3^{rd}$ person viewer.

The user may utilize any suitable digital pointing device for actuating the movements of the Avatar, such as a mouse, or a joystick, a spaceball, or a spacemouse. The customer Avatar may interact with a salesperson Avatar that may service the virtual shopping market the same as they would provide in-person service within the bricks and mortar store. When the virtual shopper sees an item of interest, a shirt for example, the software of the present invention enables their Avatar to access the computer modeled shirt, in order to hold it up, to manipulate it and examine it as if they were physically in the bricks and mortar store, and to try it on virtually, by placing it over the computer-generated Avatar of themselves, to obtain a realistic and life-like perspective of how the real garment would fit on their actual body. Animation may be used to enhance the movements of the Avatar, and the robing and disrobing of the particular garment. This $3^{rd}$ person experience may be elevated to a $1^{st}$ person experience through the use of mirrors and software that may trick the system and user. Similarly, the inputs to the system made by the user may also be at a higher lever, whereby instead of using a pointing device that is manipulated directly by the user, the user's movements/responses within the virtual environment are obtained by cameras that monitor the user's actual movements, and automatically input them into the virtual imagery. The cameras can be an HD and/or a 3D camera. A connect camera or improved versions thereof can also be used. The cameras, particularly for tourist locations and sporting events can include traffic and utility cameras A higher level virtual experience may be obtained for the virtual shopper using additional technology. The person, in addition to wearing the 3-D goggles, may also be wearing a wired glove and body suit. The wired glove and body suit, which may be only for the upper torso (shirts), or only for the lower torso (slacks), or for both (e.g., a jumpsuit, or a shirt and slacks), may incorporate therein the latest generation of haptics—a tactile feedback technology. The haptics utilize reverse-electro-vibration, whereby a current is sent to a portion of the suit to correspond to the object they are wearing or touching, to create the appropriate sensation of friction, depending on the shape, frequency, and amplitude of the signal, as it corresponds to the measured characteristics of the garment at that location. The haptics technology may thus convey to the person the nature of not only the visual texture of the material of the shirt being "held" or "worn" in the virtual shopping store, but also its tactile texture, by holding the virtual material between their gloved fingers to virtually sense its softness, or coarseness, etc.

This technology also enables a user to interact in real time, and in a pseudo 3-D virtual environment that, because of the goggles, the wired body suit, and the software, may appear to the user to be a first person experience. That is, the user may look at the bodysuit that they are wearing, through the goggles, and the software may present the appropriate representation of the clothing (the shirt) thereon, and the person in essence becomes the Avatar, and does not see a computer representation of the clothing upon a pure computer-generated image ($3^{rd}$ person viewing), but instead sees an $1^{st}$ person representation of the garment upon their body, in a convergence of the virtual world and the real world.

If the size of the garment is not satisfactory, other sizes of the same shirt may similarly be worn in the mixed real/virtual world, as well as other shirts by other designers. When the consumer decides that the garment fits appropriately and desires to acquire it, he/she may interact with the virtual store to purchase the item using a credit card or any other means of e-commerce (Paypal®, etc.), and the retail store may then process the transaction and mail the product to the consumer.

An even higher level of a virtual experience may also be obtained by utilizing 3D stereo glasses instead of the goggles, and the user may do so within a cave automatic virtual environment (CAVE) that may comprise a 6-sided cube. Multiple projectors may simultaneously project coordinated images to each of the six sides of the cube to form virtual surroundings for the participant. The 3D glasses may permit the participant to view the 2D images projected upon the sides of the cube as three-dimensional imagery. The participant's actual movements within the cube may be tracked by sensors, which may be coupled through a microprocessor of a computing system to the projectors, and serves to make corresponding adjustments to the visual image for each such movement to provide a proper view of the virtual reality. Software running on the computing system may be based upon scene rendering available using OpenScenegraph—an open source, 3D graphics API written in C-++, or using OpenGL Performer, which is a free commercial library of utility code that overlays the source code, OpenGL. Proprietary API software may also be developed to support the specific functionality of the invention described herein, which may also include the introduction of scents into the CAVE to add to the virtual experience. The scents could be real, or instead, they may be created digitally, such as with the digital scent device known as iSmell, which is being developed by DigiScents in Oakland Calif.

It should also be noted that the visual effects of the cube in the CAVE environment may comparably be achieved using the headset discussed hereinabove, whereby the headset provides imagery that encompasses the user's entire field of view. The headset may also include stereo headphones to provide the corresponding audio inputs to the user, and may also incorporate the iScent device therein to complete the virtual experience for the headset wearer. A headset microphone may be utilized to permit two-way communication between the wearer and the personnel conducting the virtual experience.

The computing system may also control an audio system that provides realistic sound inputs to the participant. The audio system may utilize a series of speakers on each side of the cube, where the intensity and type of sounds emanating from each speaker may be controlled and modified by the computing system to provide realistic sound effects, which may be coordinated with the projected imagery and the participant's movements. Instead of speakers, earphones may alternatively be utilized, and the computing system would then need to adjust the sounds to each ear to mimic the sound differential to each side that would be indicative of its origin/position.

It should be noted that the technology disclosed herein is suitable for various other applications, such as for virtual tourism. Imagery may be produced for an entire city, or regions of a city, or of museum exhibits, which may be visited in a similar fashion, with the user seeing and experiencing the scene in real time. Other applications for the invention include sporting events, concerts etc.

Software of the present invention may run on a computer, a server, a tablet, a cell phone, or other smart device, so a description of such an accessorized exemplary computer system is hereinafter disclosed, even though a particular embodiment may not require all of the described components. Exemplary computer system 200 is shown schematically in FIG. 1, and which may comprise computing unit 201 interacting with external peripherals 202, such as a separate touch screen display 244, and interacting with network resources 203, including use of the internet 261, and other computers, which may be first and second laptop computers 262/263, a tablet, a smart phone etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The RAM may be Dynamic Random Access Memory (DRAM), or Static RAM (SRAM), or any other similar type of RAM known in the art. The volatile storage 225 may also be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may be involved in carrying one or more sequences of one or more instructions to processor 222 for execution, including non-volatile media (storage device 226), and volatile media (storage device 225). Common forms of computer-readable media include, for example, a floppy disk, a hard disk, magnetic tape, or any other magnetic medium, a CD-ROM, any other optical medium, a RAM, a PROM, an EPROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by other computers (e.g. 262-263), generally with permission, and which may be located anywhere with access to the internet 261.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

I claim:

1. A system to enable an enhanced virtual shopping experience, said system comprising:

means for generating a 3-D mesh model of a person's body contours;

means for digitizing the three-dimensional shape of a piece of clothing when worn by the correspondingly sized body;

means for measuring the surface friction and the intensity and frequency of the vibrations produced during sliding tactile contact with the material of the piece of clothing, for digitally approximating a texture of the material;

means for obtaining three dimensional visual images of the interior of a store;

a 3-D headset configured to receive the three-dimensional visualization of the interior of the store, and to provide the visualization to the wearer;

a wired glove and body suit configured to provide feedback to the wearer;

a software algorithm configured to enable said 3-D mesh model of the person's body to be digitally inserted into said three-dimensional visualization of the interior of the store; said software algorithm further configured to manipulate said 3-D mesh model within the store, and to provide a current to a portion of said glove or suit to provide reverse-electro-vibration thereto, to correspond to the object that is in contact with the wearer, to create the appropriate sensation of contact that simulates actual contact.

2. The system according to claim 1 wherein the shopping experience can be enhanced through the interaction or use of social media.

3. The system according to claim 1 wherein an Avatar is generated by the system.

4. The system according to claim 3 wherein one Avatar can interact and shop with other Avatars.

5. The system according to claim 4 wherein the Avatars can be manipulated through the use of social media.

6. The system according to claim 1 wherein the model can be viewed in real time.

7. The system according to claim 1 wherein the model can be viewed in lag time.

8. The system according to claim 1 where the user is provided with a first person experience.

9. The system according to claim 1 wherein the stores can be viewed in real time.

10. The system according to claim 1 wherein the stores can be viewed in lag time.

11. The system according to claim 1 wherein the feedback is tactile feedback.

12. The system according to claim 1 wherein the feedback is electronic feedback.

* * * * *